United States Patent [19]
McCarrick et al.

[11] Patent Number: 5,941,789
[45] Date of Patent: Aug. 24, 1999

[54] ALL WHEEL DRIVE CONTINUOUSLY VARIABLE TRANSMISSION HAVING DUAL MODE OPERATION

[75] Inventors: Daniel Warren McCarrick, Canton; Barry John Melhorn, Ann Arbor; Rudolf Beim, Bloomfield Hills, all of Mich.

[73] Assignee: Ford Global Technologies, Inc., Dearborn, Mich.

[21] Appl. No.: 09/044,492

[22] Filed: Mar. 19, 1998

[51] Int. Cl.[6] .................................................. F16H 37/02
[52] U.S. Cl. ........................ 475/214; 475/204; 475/206; 475/210; 475/211; 475/212; 180/247; 180/248; 474/8; 74/15.86
[58] Field of Search ...................................... 180/247, 248; 74/15.4, 15.66, 15.86; 474/8, 11; 475/204, 206, 210, 211, 212, 214

[56] References Cited

U.S. PATENT DOCUMENTS

| | | | |
|---|---|---|---|
| 3,203,277 | 8/1965 | General | 74/689 |
| 4,458,559 | 7/1984 | Croswhite et al. | 74/730 |
| 4,543,852 | 10/1985 | Svab et al. | 74/695 |
| 4,608,032 | 8/1986 | Stockton et al. | 474/28 |
| 4,644,820 | 2/1987 | Macey et al. | 74/689 |
| 4,784,630 | 11/1988 | Takahashi | 474/28 |
| 4,820,242 | 4/1989 | Sato | 474/8 |
| 4,836,049 | 6/1989 | Moan | 74/689 |
| 4,838,836 | 6/1989 | Sakai et al. | 474/28 |
| 4,852,427 | 8/1989 | van der Veen | 74/689 |
| 4,854,919 | 8/1989 | van Lith | 474/25 |
| 4,856,369 | 8/1989 | Stockton | 74/665 GE |
| 4,876,920 | 10/1989 | Eichenberger | 74/689 |
| 4,919,007 | 4/1990 | Van Der Hardt Aberson et al. | 474/72 |
| 5,048,371 | 9/1991 | Hendriks | 74/730.1 |
| 5,049,112 | 9/1991 | Gunsing | 474/8 |
| 5,098,345 | 3/1992 | Van Vuuren | 474/8 |
| 5,853,343 | 12/1998 | Eggert et al. | 475/210 |

FOREIGN PATENT DOCUMENTS 2180020  3/1987  United Kingdom .

OTHER PUBLICATIONS

The Ford Research Dual Mode Continuously Variable Transmission, T. R. Stockton, Oct. 1994.

*Primary Examiner*—Khoi Q. Ta
*Assistant Examiner*—Tisha D. Waddell
*Attorney, Agent, or Firm*—Frank G. McKenzie

[57] ABSTRACT

An automatic transmission for an automotive vehicle includes a continually variable drive mechanism having one sheave assembly fixed to an intermediate shaft and the input sheave assembly supported on an input shaft, a low speed gearset driveably connected to the input shaft and an output shaft, a fixed ratio drive mechanism in the form of a chain drive providing a torque delivery path between the intermediate shaft and the carrier of the gearset, a transfer clutch for connecting and releasing the first sheave of the variable drive mechanism and input shaft, a low brake, a reverse gearset, a reverse brake, and a clutch for selectively driveably connecting the output of the fixed drive mechanism and a front output shaft.

11 Claims, 1 Drawing Sheet

| | Friction Element | | |
|---|---|---|---|
| RANGE | LOW 98 | REV 100 | TRF 102 |
| LOW | X | | |
| VAR | | | X |
| REV | | X | |

ALL WHEEL DRIVE CONTINUOUSLY VARIABLE TRANSMISSION HAVING DUAL MODE OPERATION

BACKGROUND OF THE INVENTION

1. Field of the Invention

This invention relates to automatic transmissions for automotive vehicles. More particularly it pertains to such transmissions having a fixed ratio drive mechanism and a variable ratio drive mechanism.

2. Description of the Prior Art

A conventional multiple speed transmission has a number of spaced speed ratio changes produced by selectively holding and releasing components of a planetary gear set. An infinitely variable transmission that employs two variable diameter pulleys, and a drive belt engaging the pulleys provides a continuously variable speed ratio over a broad range of engine speeds.

A bladed hydrokinetic torque converter located in the drive path between an engine and the planetary gearing provides additional torque multiplication for accelerating a motor vehicle from rest. A stall torque ratio of about 2.5:1 may be realized using a torque converter.

A continuously variable transmission combining a fixed drive unit, variable drive unit, and torque converter is described in UK Patent application GB-2180020, assigned to the assignee of the present invention. After the torque converter reaches its coupling phase, when the ratio of the hydrokinetic unit is 1:1, the drive ratio for the powertrain is reduced to 8:1 from approximately 20:1 when the fixed drive ratio is 2:1 and the final drive and axle system ratio is 4:1. At that time the variable ratio drive is activated. Upon further acceleration of the vehicle, the overall transmission ratio may be controlled from 8:1 down to 2:1.

U.S. Pat. Nos. 4,856,369, 4,836,049 and 3,203,277 describe continually variable transmissions that employ a variable drive mechanism and a fixed drive mechanism in combination with a torque converter and planetary gearing.

SUMMARY OF THE INVENTION

It is an object of this invention to provide a transmission able to accelerate a motor vehicle from rest through a speed reduction drive that bypasses a belt driven variable ratio drive mechanism so that the relatively large starting torque is carried by robust mechanical components and not by torque limited components, such as a drive belt.

It is another object of this invention that the transmission produce a continuously variable speed ratio over a range from the first gear (starting gear) ratio to the highest ratio, an overdrive ratio.

It is yet another object of the invention to provide a transmission able to drive both front and rear wheels from two output shafts and without need for a transfer case to divide output torque carried on a single output shaft and to transmit torque to front and rear driveshafts.

According to the invention a continuously variable transmission for an automotive vehicle includes an input shaft; an intermediate shaft; an output shaft; a variable ratio drive mechanism having an input, and an output driveably connected to the input and intermediate shaft, for producing a continuously variable ratio of the speed of the input to the speed of the output; a fixed ratio drive mechanism having an first element, and a second element driveably connected to the first element and intermediate shaft; a gearset having a first gearset portion driveably connected to the input shaft, output shaft and first element, for driving the output shaft at a slower speed than the speed of the input shaft; a transfer clutch for alternately driveably connecting and disconnecting the input of the variable ratio drive mechanism and input shaft; and a low brake alternately holding against rotation and releasing an element of the first gearset portion.

Torque is transmitted to front axle shafts through a second output shaft and a clutch for alternately driveably connecting and disconnecting the intermediate shaft and second output shaft.

A reverse drive feature of the invention includes a second gearset portion driveably connected to the input shaft and output shaft, for driving the output shaft in a reverse direction and at a slower speed than the direction and speed of the input shaft; and further comprising a reverse brake for alternately holding against rotation and releasing an element of the second gearset portion, whereby the output shaft is driven at a slower speed and opposite direction than the speed and direction of the input shaft when the reverse brake is engaged.

DESCRIPTION OF THE PREFERRED EMBODIMENT

Figures 1, 2:
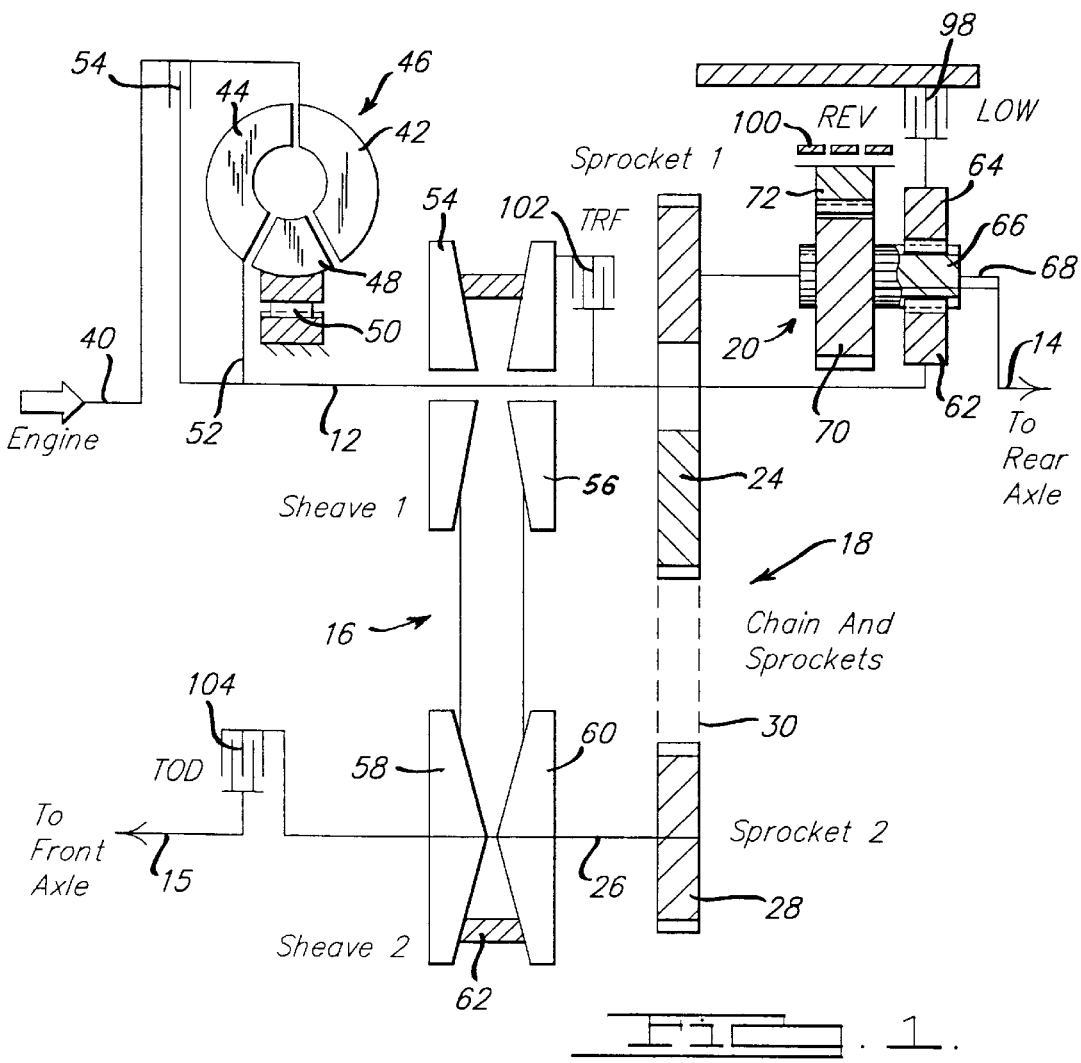
FIG. 1 is a schematic diagram of the kinematic arrangement for an automatic transmission according to the present invention.
FIG. 2 is a chart showing the engaged and disengaged state of clutches and brakes of the transmission of FIG. 1.

Referring first to FIG. 1, a continuously variable transmission according to this invention includes an input shaft 12, rear output shaft 14, front output shaft 15, variable ratio drive mechanism 16, fixed ratio drive mechanism 18, a Ravigneau planetary gearset 20, and various clutches for controlling the mechanical elements of the transmission.

Fixed ratio drive mechanism 18 driveably connects output shaft 14, which is driveably connected by a gearset carrier to sprocket wheel 24, and intermediate shaft 26, which supports a second sprocket wheel 28, sprockets 24, 28 being mutually driveably engaged through a chain 30. Alternatively, shaft 26 can be driveably connected to shaft 14 through another fixed ratio gear mechanism, such as a simple layshaft arrangement including gears in place of sprockets 24, 28 and an idler gear meshing with those gears so that shaft 26 turns in the same direction as shaft 14. The first sprocket 24 is rotatably supported on shaft 14; the second sprocket 28 is fixed to, and rotatably supported on intermediate shaft 26.

The engine crankshaft 40 is driveably connected to a hydrokinetic torque converter 46 that includes a bladed impeller wheel 42 arranged in a toroidal fluid flow path with a bladed turbine wheel 44, arranged to be driven hydrodynamically by fluid exiting the impeller wheel. A bladed stator wheel 48 is located in the flow path between fluid entrance to the impeller and the fluid exit of the turbine. A one-way clutch 50 rotatably supports the stator wheel and allows it to rotate in one direction about the axis of shaft 12. The torus of the torque converter is filled with hydraulic fluid, and the turbine wheel 44 is supported rotatably on a turbine hub 52, which is connected, driveably to input shaft 12. A hydraulically operated bypass clutch 54 alternately mechanically connects engine shaft 40 and input shaft 12 when clutch 50 is engaged, and allows impeller 42 to drive turbine 44 hydraulically when clutch 54 is disengaged. The torque converter produces torque amplification and speed reduction until it reaches coupling speed.

Input shaft 12 is connected, preferably through torque converter 46, to a source of power, such as an internal combustion engine or electric motor. Rear output shaft 14 is driveably connected to the drive wheels of a motor vehicle, preferably to the rear wheels. Front output shaft 15 is driveably connected to the drive wheels of a motor vehicle, preferably to the front wheels. Alternatively, output shaft 14 can be connected to the front axles, and output shaft 15 can be connected to the rear axles.

Variable ratio drive mechanism 16 includes a first sheave assembly, which includes pulleys 54, 56 supported rotatably on input shaft 12, and a second sheave assembly, which includes pulleys 58, 60 fixed to and supported rotatably on intermediate shaft 26. The axial position of one of the first pair of pulleys 54, 56 is fixed on the input shaft, the other pulley of the pair is moveable axially along the shaft, preferably in response to hydraulic pressure applied to an actuating device, so that the radial position of the drive belt 62 moves in accordance with the axial position of the axially displaceable pulley due to the inclined surfaces of the pulley faces that engage driveably the lateral surfaces of the drive belt 62. Similarly, one of the pulleys 58, 60 on shaft 26 is fixed in its axial position, and the other pulley is axially displaceable so that the inclined inner faces of the pulleys are continually engaged at a variable radial position with lateral surfaces of drive pulley 62. Movement of the displaceable pulleys is mutually coordinated so that they maintain driving contact with the belt. In this way the speed ratio produced by mechanism 16 is continuously variable.

Gearset 20 includes a sun gear 62 connected driveably to input shaft 12, a first ring gear 64 coaxial with and surrounding the sun gear, a set of long planet pinions 66 meshing with the sun gear and ring gear 64, a ring gear 72, a set of short planet pinions 70 meshing with pinions 66 and ring gear 72, and a revolving carrier 68 rotatably supporting planet pinions 66, 70 and driveably connected to output shaft 14 and sprocket 24.

The elements of the transmission according to this invention are controlled operatively by various clutches and brakes, preferably hydraulically actuated friction devices, including low brake 98, reverse brake 100, transfer clutch TRF 102, and torque on demand (TOD) clutch 104. These clutches may be hydraulically, mechanically or electrically operated. Low brake 98 alternately holds ring gear 64 against rotation and releases that ring gear to rotate; reverse brake 100 alternately holds and releases ring gear 72; transfer clutch TRF 102 alternately driveably connects and releases pulleys 54, 56 and shaft 12; and torque on demand (TOD) clutch 104 alternately driveably connects and releases intermediate shaft 26 and output shaft 15.

First or low gear is produced by engaging low brake 98 and releasing all the other friction elements, except that clutch 104 is engaged when drive to both front and rear axles is desired, as discussed below. Brake 98 then holds ring gear 64 against rotation, and sun gear 62 is driven by the input shaft 12. Therefore, carrier 68 and shaft 14, which is connected driveably to the rear wheels, are underdriven in the same direction as the direction and speed of the engine. Carrier 68 can drive the front axle through drive mechanism 18, shaft 26, TOD clutch 104 and shaft 15. In this way four-wheel drive and/or all wheel drive can be produced by engaging clutch 104. TOD clutch 104 is engaged to directly connect front output shaft 15 to the intermediate shaft 26, or engagement of that clutch is modulated to control the magnitude of torque transmitted to shaft 15.

An upshift to the continuously variable range is accomplished by engaging transfer clutch 102 and disengaging the other friction elements.

In the CVT mode, TRF clutch 102 connects input shaft 12 to a first sheave, whose pulleys 54, 56 drive the pulleys 58, 60 of a second sheave through belt 62 at a variable speed ratio that depends on the relative diameters of the sheaves where belt 62 engages the pulleys. Shaft 26, which is driven by pulleys 58, 60, drives sprocket 28, which drives the rear output 14 and the rear wheels through chain 30, sprocket 24 and carrier 68. The TOD clutch 104 can be used to driveably connect the second sheave to the front output shaft 15 also, as described above.

Preferably the speed ratio produced in first or low gear through operation of gear unit 22 is spaced slightly from the speed ratio at the lowest end of the continually variable range produced through operation of the variable ratio drive 16. In this way the transition from first gear to the lowest variable gear ratio is an upshift.

Preferably ring gear 72 has 135 teeth, ring gear 64 has 75 teeth, sun gear 62 has 41 teeth, pinions 70 have 50 teeth, and pinions 66 have 17 teeth. The gear ratio in low gear is 2.829; at the low end of the continuously variable range the gear ratio is 2.018; at the mid-range of the CV range where the speed of sheave 1 and sheave 2 is substantially equal, the gear ratio is 1.009; and at the high end of the CV range, the gear ratio is 0.525. The gear ratio in reverse drive is −2.293.

Reverse drive is produced by engaging reverse band or brake 100, and disengaging the other friction elements, except that TOD clutch 104 may be engaged to drive the front wheels when desired, as explained below. These actions hold ring gear 72 fixed against rotation. Since sun gear 62 is connected to input shaft 12, pinions 66, 70 are driven rotatably by sun gear 62, and carrier 68, which revolves due to rotation of pinions 70 on ring gear 72, is underdriven in the opposite direction in comparison to the speed and direction of the engine. The rear wheels are driven in this way by carrier 68 through shaft 14. The carrier 68 also drives sprocket 24, from which the front wheels may be driven through the fixed ratio mechanism 18, TOD clutch 104 and front output shaft 15.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A continuously variable transmission comprising:
   an input shaft;
   an intermediate shaft;
   an output shaft;
   a variable ratio drive mechanism having an input, and an output driveably connected to the input and intermediate shaft, for producing a continuously variable ratio of the speed of the input to the speed of the output;
   a fixed ratio drive mechanism having an first element, and a second element driveably connected to the first element and intermediate shaft;
   a gearset having a first gearset portion driveably connected to the input shaft, a second gearset portion connected to the output shaft and first element, for driving the output shaft at a slower speed than the speed of the input shaft;

a transfer clutch for alternately driveably connecting and disconnecting the input of the variable ratio drive mechanism and input shaft; and a low brake alternately holding against rotation and releasing a third gearset portion of the said gearset.

2. The transmission of claim 1 further comprising:

a second output shaft; and a clutch for alternately driveably connecting and disconnecting the intermediate shaft and second output shaft.

3. The transmission of claim 1 wherein the second gearset portion connected to the input shaft and output shaft, drives the output shaft in a reverse direction and at a slower speed than the direction and speed of the input shaft; and further comprising a reverse brake for alternately against rotation and releasing a fourth gearset portion of the gearset, whereby the output shaft is driven at a slower speed and opposite direction than the speed and direction of the input shaft when the reverse brake is engaged.

4. The transmission of claim 1 further comprising:

a torque converter having an impeller adapted for a driveable connection to a power source, a turbine adapted for a hydrokinetic drive connection to the impeller and driveably connected to the input shaft.

5. The transmission of claim 1, wherein the fixed ratio drive mechanism includes a first sprocket driveably fixed to said first gearset portion, a second sprocket driveably fixed to the intermediate shaft, and a flexible continuous element driveably engaging the first and second sprockets; and the variable ratio drive includes a first sheave, a second sheave driveably fixed to the intermediate shaft, and a flexible continuous element driveably engaging the first and second sheaves at steplessly variable radial positions.

6. A continuously variable transmission comprising:

an input shaft;

an intermediate shaft;

an output shaft;

a variable ratio drive mechanism having an input, and an output driveably connected to the input and intermediate shaft, for producing a continuously variable ratio of the speed of the input to the speed of the output;

a fixed ratio drive mechanism having an first element, and a second element driveably connected to the first element and intermediate shaft;

a gearset having a sun gear, a first ring gear surrounding the sun gear, a carrier driveably connected to the output shaft and first element, and a first set of planet pinions rotatably supported on the carrier and meshing with the sun gear and first ring gear;

a transfer clutch for alternately driveably connecting and disconnecting the input of the variable ratio drive mechanism and input shaft; and a low brake alternately holding against rotation and releasing the first sun gear.

7. The transmission of claim 6 further comprising:

a second output shaft; and a clutch for alternately driveably connecting and disconnecting the intermediate shaft and second output shaft.

8. The transmission of claim 6 wherein the gearset further comprises a second gearset having a second ring gear and a second set of planet pinions, rotatably supported on the carrier and meshing with the first set of planet pinions, and second ring gear driveably connected to the input shaft and output shaft; and a reverse brake for alternately holding against rotation and releasing the second ring gear, whereby the output shaft is driven at a slower speed and opposite direction than the speed and direction of the input shaft when the reverse brake is engaged.

9. The transmission of claim 6, wherein the fixed ratio drive mechanism includes a first sprocket driveably fixed to an element of the first gearset, a second sprocket driveably fixed to the intermediate shaft, and a flexible continuous element driveably engaging the input sprocket wheel and output sprocket wheel; and the variable ratio drive includes a first sheave, a second sheave driveably fixed to the intermediate shaft, and a flexible continuous element driveably engaging the first and second sheaves at steplessly variable radial positions.

10. A continuously variable transmission comprising:

an input shaft;

an intermediate shaft;

an output shaft;

a variable ratio drive mechanism having a variable ratio drive includes a first sheave, a second sheave driveably fixed to the intermediate shaft, and a flexible continuous element driveably engaging the first sheave and second sheave at steplessly variable radial positions for producing a continuously variable ratio of the for producing a continuously variable ratio of the input speed to the output speed of the second sheave to the speed of the first sheave;

the fixed ratio drive mechanism includes a first sprocket, a second sprocket driveably fixed to the intermediate shaft, and a flexible continuous element driveably engaging the first sprocket and second sprocket;

a gearset having a sun gear, a first ring gear surrounding the sun gear, a carrier driveably connected to the output shaft and first element, and a first set of planet pinions rotatably supported on the carrier and meshing with the sun gear and first ring gear, a second ring gear and a second set of planet pinions, rotatably supported on the carrier and meshing with the first set of planet pinions, and second ring gear driveably connected to the input shaft and output shaft;

a transfer clutch for alternately driveably connecting and disconnecting the input of the variable ratio drive mechanism and input shaft; and a reverse brake for alternately holding against rotation and releasing the second ring gear, whereby the output shaft is driven at a slower speed and opposite direction than the speed and direction of the input shaft when the reverse brake is engaged; and a low brake alternately holding against rotation and releasing the first ring gear.

11. The transmission of claim 10, further comprising:

a second output shaft; and a clutch for alternately driveably connecting and disconnecting the intermediate shaft and second output shaft.

* * * * *